No. 636,737. Patented Nov. 7, 1899.
C. H. BAGLEY.
MIXING DEVICE.
(Application filed Dec. 27, 1898.)
(No Model.)
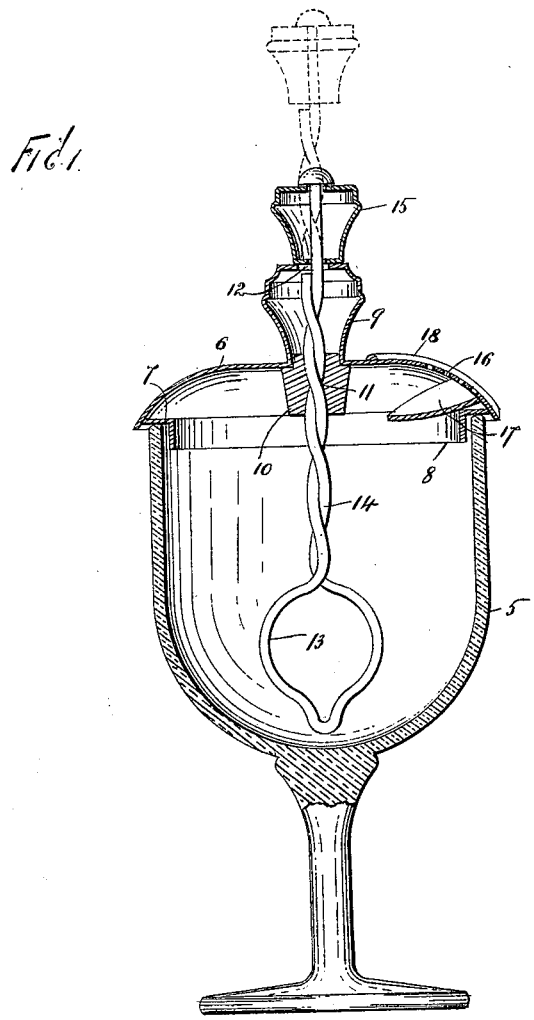
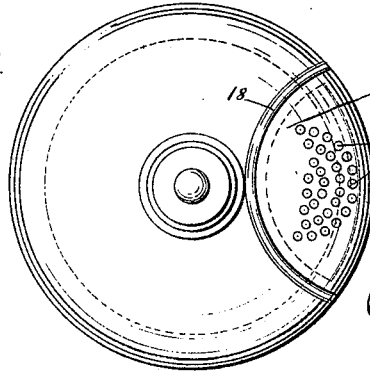
WITNESSES
F. A. Stewart
H. E. Langtry
INVENTOR
Charles H. Bagley.
BY
Edgar Tate & Co
ATTORNEYS.

UNITED STATES PATENT OFFICE.

CHARLES H. BAGLEY, OF HOBOKEN, NEW JERSEY, ASSIGNOR OF ONE-HALF TO TIMOTHY W. DORSETT, OF SAME PLACE.

MIXING DEVICE.

SPECIFICATION forming part of Letters Patent No. 636,737, dated November 7, 1899.

Application filed December 27, 1898. Serial No. 700,335. (No model.)

*To all whom it may concern:*

Be it known that I, CHARLES H. BAGLEY, a citizen of the United States, residing at Hoboken, in the county of Hudson and State of New Jersey, have invented certain new and useful Improvements in Mixing Devices, of which the following is a full and complete specification, such as will enable those skilled in the art to which it appertains to make and use the same.

This invention relates to mixing devices; and the object thereof is to provide an improved device of this class for use in mixing cocktails, punches, sours, fizzes, juleps, and other drinks requiring shaking and straining in goblets or similar vessels in which the liquids to be mixed are placed in connection with finely chopped or broken ice.

The invention is fully disclosed in the following specification, of which the accompanying drawings form a part, in which—

Figure 1 is a central vertical section of an ordinary goblet provided with my improved mixer, which is also shown in section; and Fig. 2 is a plan view of the mixer.

In the drawings forming part of this specification the separate parts of my improvement are designated by the same numerals of reference in each of the views, and in said drawings I have shown at 5 a goblet on which my improved mixer is placed.

The mixer consists of a circular disk or plate 6, which is preferably convexo-concave in form and which is provided adjacent to the perimeter with an inwardly-directed annular flange 7, having a downwardly-directed rim 8, and the disk or plate 6 is adapted to be placed on and serve as a cover for the goblet 5, and in this position of said disk or plate the inwardly-directed annular flange 7 rests on the top of the goblet, while the rim 8 projects downwardly therein. The disk or plate 6 is provided centrally of the top thereof with an upwardly-directed extension 9, which serves as a handle and which is circular in cross-section and the lower end of which is preferably smaller than the top thereof, and secured in said lower end is a plug 10, provided with a central bore 11, and the top of the handle 9 is provided with a central opening 12.

The mixer or stirrer proper comprises a laterally-extended loop or body 13, having a pointed lower end, and is provided with a shank 14, which passes through the plug 10 and the opening 12 in the top of the handle 9, and to which is secured a knob or head 15. The mixer or stirrer 13 and the shaft 14 thereof are preferably composed of wire, the ends of which are brought together and twisted to form a spiral, and the central opening 11 in the plug 10 is also spiral in form. The spiral portion of the shank 14 extends only approximately through the handle 9 when the mixer is in its lowest position, and the extreme upper end of said shank is adapted to turn in the knob or head 15, which is loosely mounted thereon.

Although I have shown the shank 14 of the mixer as made spiral in form by twisting two wires together, the said shank may be composed of a single piece provided with a thread of great pitch, and the central opening 11 in the plug 10 may be provided with a corresponding thread, the object of this construction being to provide means whereby the mixer or beater 13 will be rapidly revolved as the shank 14 thereof is pulled or forced through the plug 10 by means of the knob or head 15.

The disk or plate 6 is provided in one side thereof and adjacent to its perimeter with a plurality of perforations 16, and secured within said disk or plate below said perforations is a concavo-convex shield 17, the inner perimeter of which is segmental in form, said shield being shown in full lines in Fig. 1 and in dotted lines in Fig. 2, and the top or upper surface of said disk or plate 6 is also preferably provided with a segmental flange or bead 18, which partially incloses the perforations 16.

The operation will be readily understood from the foregoing description when taken in connection with the accompanying drawings and the following statement thereof.

The disk or plate 6 is placed on the goblet 5, as shown in Fig. 1, and one hand is applied to the top thereof to hold it in position, while the knob or head 15 is grasped by the other hand and the shank 14 is pulled through the plug 10. In this construction the mixer 13 is rapidly revolved in the goblet 5 and also rises therein, and the said mixer is also rapidly revolved as the knob or head 15 is depressed and the shank 14 forced downwardly through the plug 10. The upper end of one of the parts which form the shank 14 prevents the knob or head 15 from passing downwardly on the shank 14, and both parts of the shank 14 are free to pass through the opening 12 in the top of the handle 9 of the disk or plate 6.

The above-described operation constitutes the mixing process, and the material to be mixed is placed in the goblet 5 in the usual manner. The mixer is especially adapted to enter between the fragments of ice contained in a cocktail or other mixed drink and to rotate said ice in the mixing process, thereby assisting the agitation and commingling of the fluids.

The perforations 16 in one side of the disk or plate 6 serve as a strainer, and the shield 17 serves to prevent said perforations from being clogged by large substances in straining the contents of the goblet, and said shield also serves to prevent the fluids in the goblet from flowing out through the perforations in the disk or plate in the operation of stirring the contents of the goblet or mixing the same, and in this latter operation the goblet and the disk or plate are grasped so as to hold the latter firmly on the top of the former, which is tilted in order to pour the contents through the perforations 16.

The bead or flange 18 is designed to serve as a guard for the perforations 16 and to prevent the operator from covering said perforations with his fingers in the operation of pouring out or straining the contents of the goblet, and that portion of the disk or plate in which the perforations are formed may be raised, if desired, in which event the bead or flange 18 would not be necessary.

This device is simple in construction and effective in operation and is well adapted to accomplish the result for which it is intended, while being also comparatively inexpensive.

Although I have described my improvement as adapted particularly for use in preparing mixed drinks, it will be apparent that the same may be employed for mixing drugs and used as a beater for various purposes.

It will be apparent that changes in and modifications of the construction herein described may be made without departing from the spirit of my invention or sacrificing its advantages, and I reserve the right to make all such alterations therein and modifications thereof as fairly come within the scope of my invention.

Having fully described my invention, I claim as new and desire to secure by Letters Patent—

In a device of the class described, a cover adapted to fit a goblet or similar vessel and provided at one side with perforations, and a shield secured to the lower surface of said cover between said perforations and the adjacent portion of the edge thereof and projecting laterally beneath said perforations, substantially as shown and described.

In testimony that I claim the foregoing as my invention I have signed my name, in presence of the subscribing witnesses, this 24th day of December, 1898.

CHARLES H. BAGLEY.

Witnesses:
F. A. STEWART,
V. M. VOSLER.